United States Patent Office 3,355,827
Patented Dec. 5, 1967

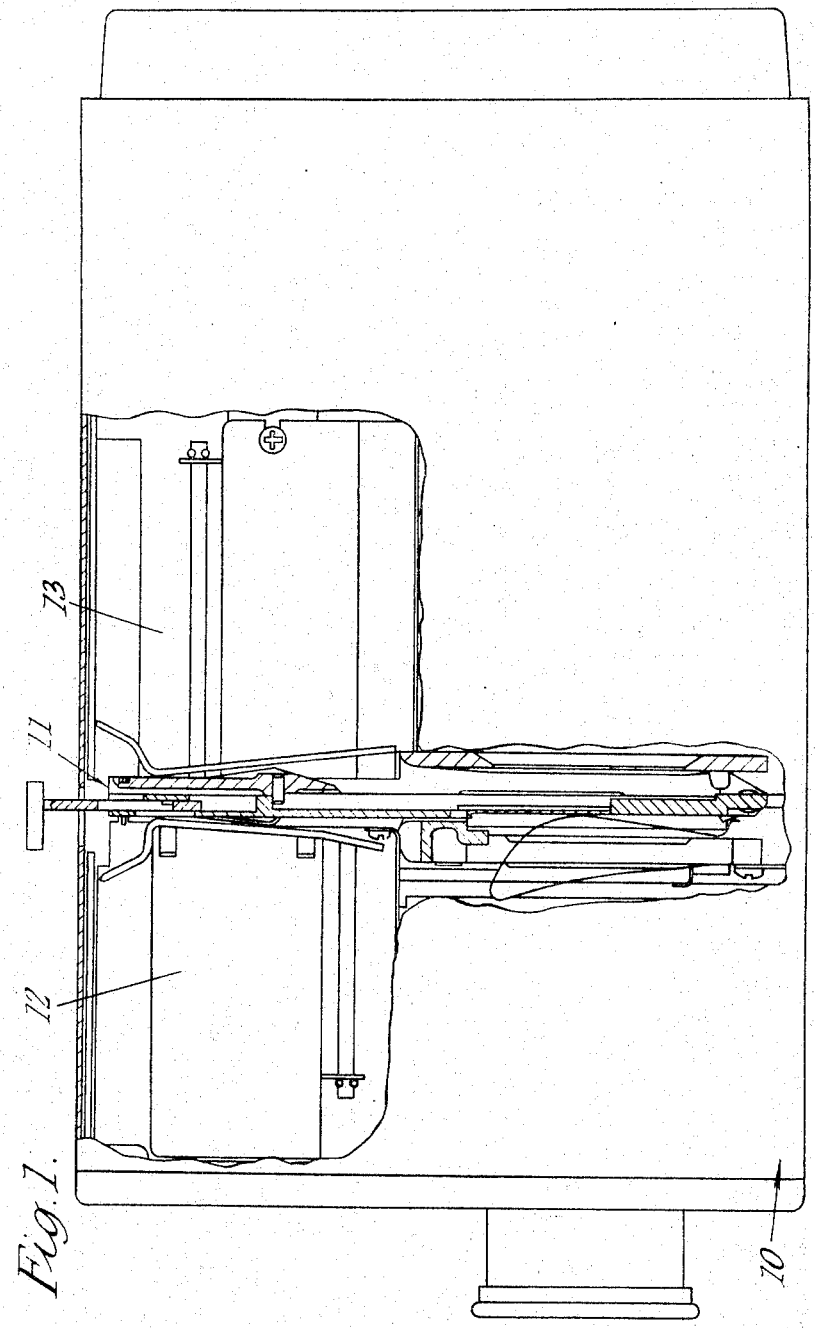

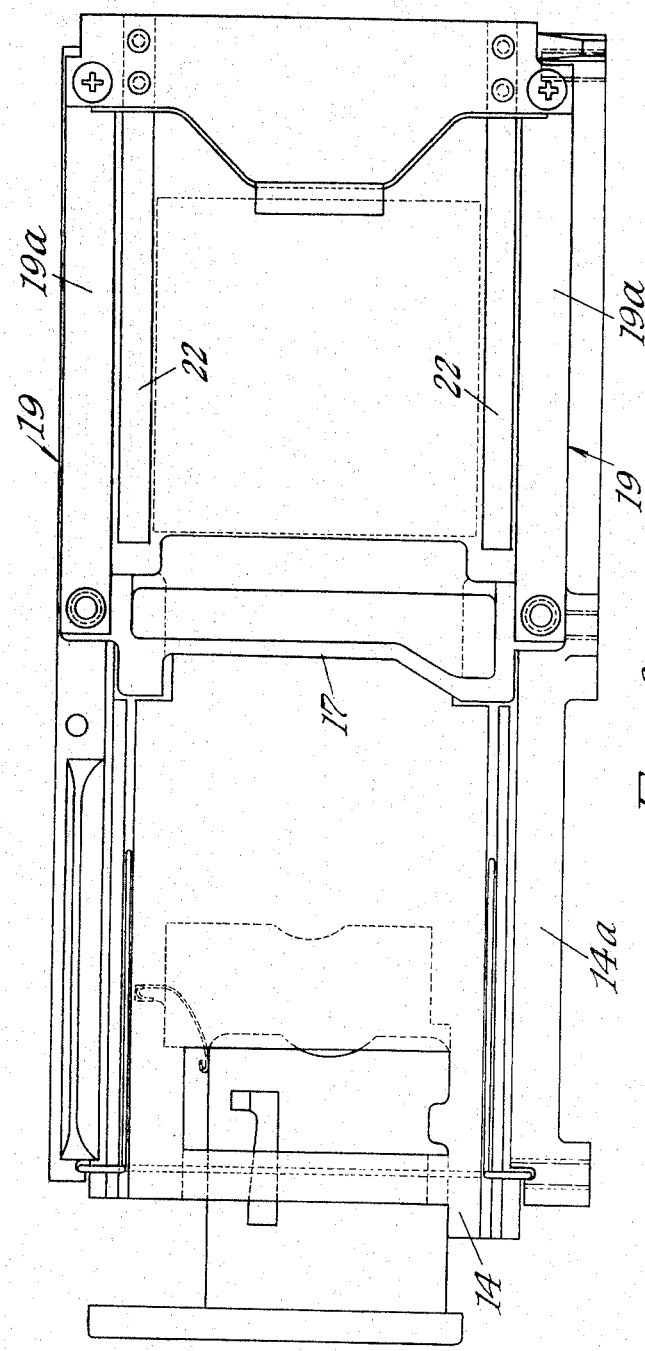

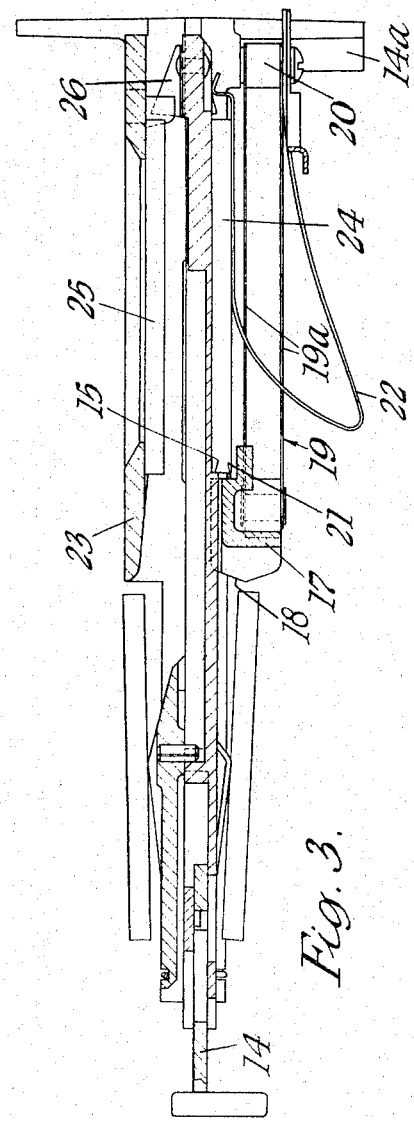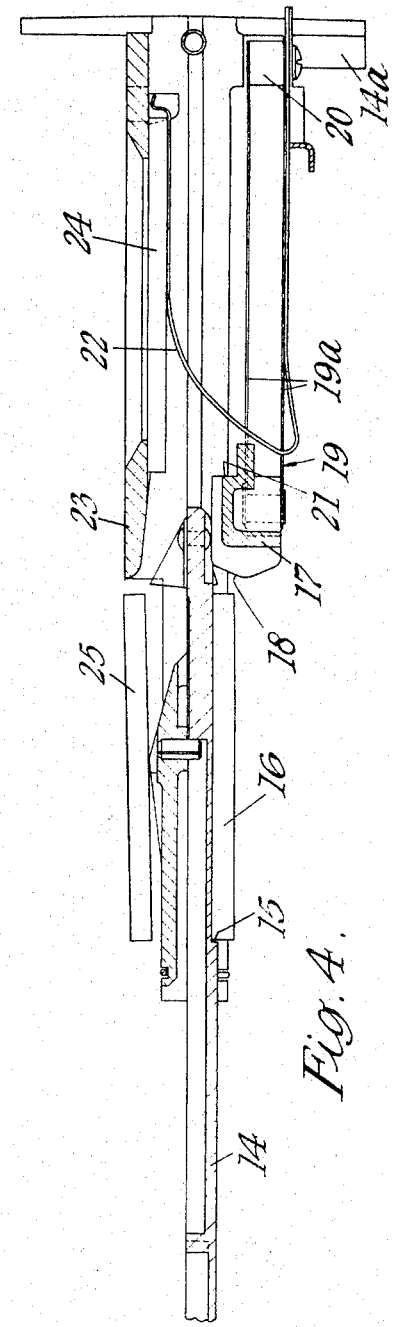

3,355,827
SLIDE CHANGING MECHANISM
Denis Vernon Bosley, 235 Barrows Lane, South Yardley,
Birmingham, England
Filed Dec. 13, 1965, Ser. No. 513,509
Claims priority, application Great Britain, Dec. 14, 1964,
50,727/64
3 Claims. (Cl. 40—79)

This invention relates to slide-changing mechanism for use in optical projection apparatus and has for its object the provision of such mechanism in a simple and convenient form.

Slide-changing mechanism in accordance with the invention incorporates slide latching means comprising a detent member which is mounted for movement in a direction transverse to the direction of movement of slides into and out of the projection apparatus, said detent member being so shaped in relation to a slide which is to be inserted into the apparatus that engagement of the leading edge of the slide and the outer edge of the detent member will result in the latter being displaced to permit entry of the slide, and there being also provided resilient means connected to said detent member to urge it into a position in which its inner edge forms a stop to prevent premature withdrawal of the slide after the trailing edge of the slide has passed the detent member on insertion of the slide.

Preferably, said resilient means comprises at least one cantilevered spring.

The invention will now be more particularly described with reference to the accompanying drawings wherein FIGURE 1 is a plan view of an optical projection apparatus incorporating one example of a slide-changing mechanism in accordance with the invention, FIGURE 2 is a side elevation of the slide-changing mechanism, FIGURE 3 is a part-sectional plan view of the mechanism shown in FIGURE 2 and FIGURE 4 is a further part-sectional plan view of said mechanism but with the slide carrier shown in a retracted position prior to the insertion of a slide.

FIGURES 2, 3 and 4 are drawn on a larger scale as compared with FIGURE 1.

Referring now to the drawings the slide-changing mechanism shown therein is designed for use in conjunction with an optical projection apparatus shown in FIGURE 1 and generally indicated by reference numeral 10 (the apparatus having a light source and optical system which may be of any known form and which form no part of the present invention) said mechanism being generally indicated in FIGURE 1 by reference numeral 11. As will also be seen from FIGURE 1 the projector is provided with an input guide 12 which is adapted to receive a stack of slides from which slides will be successively taken by the slide-changing mechanism for insertion into the projecting position and an output guide 13 into which slides are returned by said mechanism after they have been projected. Said slide-changing mechanism 11 includes a slide carrier 14 slidable in a guide 14a and which is manually movable in a direction perpendicular to the optical axis of the apparatus and which is formed on one side with a step 15 adapted to engage the trailing edge of the leading slide 16 (see FIGURE 4) of a stack of slides positioned in use in the input guide so that on inward movement of the slide carrier 14 said leading slide 16 will be carried into the apparatus.

There is also provided slide-changing means which comprises a detent member in the form of a post 17 which extends in a vertical or substantially vertical direction on that side of the mechanism adjacent to the input guide. The outer edge of said detent member (namely that edge which would be remote from the optical axis) is chamfered (as indicated by reference numeral 18) or otherwise shaped so that when it is engaged by the leading edge of a slide which is being inserted into the apparatus by the slide-carrier it will be deflected in a direction transverse to the direction of movement of said slide carrier and slide. For this purpose said detent member 17 is carried by resilient means in the form of at least one and preferably two cantilevered springs 19. Each spring 19 comprises a pair of resilient blades 19a secured at one pair of adjacent ends to a fixed support 20 and at the other pair of adjacent ends to the detent member 17. Each spring 19 will therefore act in a manner somewhat similar to a parallel action linkage so that the orientation of the detent member 17 relative to the slide will remain constant or substantially constant, it being understood that the two springs 19 connected to the detent member will provide a restoring force which tends to urge said detent member back towards its original position after it has been displaced by the leading edge of a slide which is being inserted.

Thus when the trailing edge of a slide which is being inserted has passed the detent member the aforesaid springs will cause the detent member to move back into its original position and in this position the inner edge 21 (see FIGURE 3) of said member will act as a stop which prevents withdrawal of the slide when the slide carrier is retracted.

There is also provided further springs 22 mounted between the aforementioned cantilevered springs 19 and which are arranged to engage the slide as the latter moves past the detent member. Said further springs 22 carry the slide in a direction parallel to the optical axis of the apparatus and away from the detent member until the slide engages a fixed frame 23 where it will be in position for projection. In FIGURE 3 the slide 24 has just been inserted by the slide carrier while slide 25 is the slide which has just been projected. Retraction of the slide carrier from the position shown in FIGURE 3 to the position shown in FIGURE 4 will have the effect of withdrawing slide 25 (the resilient projection 26 on the slide carrier engaging the adjacent edge of the slide 25) to deposit it in the output guide of the projector whilst the springs 22 will then carry slide 24 into engagement with the fixed frame 23 as shown in FIGURE 4.

Adjustment of the shape, spacing and characteristic of said springs 19 can be made to obtain any desired deflection of the detent member 17 and any desired contact angle between the detent member and a slide being inserted and also to vary the resistance between said member 17 and said slide when the latter moves past the detent member. It will however be appreciated that the resistance offered by the detent member 17 to the motion of each slide being inserted into the apparatus is substantially independent of the slide thickness.

Having thus described by invention what I claim as new and desire to secure by Letters Patent is:

1. A slide-changing mechanism for use in optical projection apparatus, said mechanism incorporating slide latching means comprising a detent member movable in a direction transverse to the direction of movement of slides into and out of the projection apparatus and resilient means connected to said detent member, said detent member being so shaped that engagement of the leading edge of a slide to be inserted into the apparatus and the outer edge of the detent member will result in the latter being displaced to permit entry of the slide, said resilient means urging the detent member into a position in which its inner edge forms a stop to prevent premature withdrawal of the slide after the trailing edge of the slide has passed the detent member on insertion of the slide.

2. A slide-changing mechanism as claimed in claim 1 wherein said resilient means comprises at least one cantilevered spring.

3. A slide-changing mechanism as claimed in claim 2 wherein there is provided a fixed support and wherein said cantilivered spring comprises a pair of resilient blades arranged in a spaced parallel relationship, said blades being connected at one pair of adjacent ends to said fixed support and at the other pair of adjacent ends to said detent member.

References Cited

UNITED STATES PATENTS

| | | | |
|---|---|---|---|
| 586,245 | 7/1897 | Riley. | |
| 2,617,218 | 11/1952 | Antos | 40—79 |
| 3,002,426 | 11/1961 | McCabe | 40—79 X |
| 3,258,867 | 7/1966 | Hall | 40—79 |

EUGENE R. CAPOZIO, *Primary Examiner.*

R. CARTER, *Assistant Examiner.*